(12) United States Patent
Davis et al.

(10) Patent No.: US 8,042,774 B2
(45) Date of Patent: Oct. 25, 2011

(54) CONTROL PANEL MOUNT HAVING ONE OR MORE STRAIN RELIEF FEATURES

(75) Inventors: David R. Davis, Richton Park, IL (US); Dale R. Swenson, Suwanee, GA (US); Kevin L. Nelson, Cumming, GA (US); Daniel J. Smith, Macon, GA (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 12/245,124

(22) Filed: Oct. 3, 2008

(65) Prior Publication Data

US 2010/0084518 A1 Apr. 8, 2010

(51) Int. Cl.
*F16L 3/22* (2006.01)

(52) U.S. Cl. ............... 248/68.1; 248/74.3; 248/317

(58) Field of Classification Search ............... 248/68.1, 248/58, 60, 65, 69, 70, 74.3, 104, 102, 328, 248/341, 693, 288.31, 317; 24/16 PB, 304, 24/298, 299
See application file for complete search history.

(56) References Cited

U.S. PATENT DOCUMENTS

| | | | | |
|---|---|---|---|---|
| 1,132,999 | A | * | 3/1915 | Beers ............... 248/62 |
| 2,288,172 | A | * | 6/1942 | Ulrich ............... 248/610 |
| 2,532,255 | A | * | 11/1950 | Davis ............... 248/215 |
| 3,147,523 | A | | 9/1964 | Logan |
| 3,170,206 | A | * | 2/1965 | Triplett ............... 24/298 |
| 3,261,579 | A | * | 7/1966 | Engman et al. ............... 248/60 |
| 3,461,510 | A | | 8/1969 | Holmes |
| 3,568,262 | A | | 3/1971 | Woldman |
| 3,625,553 | A | | 12/1971 | Mattioli |
| 3,632,071 | A | | 1/1972 | Cameron et al. |
| 3,957,241 | A | | 5/1976 | Morris et al. |
| 4,050,327 | A | | 9/1977 | Thomas et al. |
| 4,389,754 | A | | 6/1983 | Sohma |
| 4,432,120 | A | * | 2/1984 | Sherman et al. ............... 24/299 |
| 4,515,336 | A | | 5/1985 | Fischer |
| 4,702,443 | A | * | 10/1987 | Callaway ............... 248/51 |
| 4,805,856 | A | | 2/1989 | Nicoli et al. |
| 4,875,647 | A | | 10/1989 | Takagi et al. |
| 5,106,177 | A | | 4/1992 | Dolasia |
| 5,131,613 | A | | 7/1992 | Kamiya et al. |
| 5,365,639 | A | | 11/1994 | Lewkoski |
| 5,598,994 | A | | 2/1997 | Olewinski et al. |
| 5,699,591 | A | * | 12/1997 | Kane ............... 24/304 |
| 5,803,413 | A | | 9/1998 | Benoit et al. |
| 5,826,849 | A | | 10/1998 | Johnson et al. |
| 5,911,392 | A | | 6/1999 | Greenslate |
| 5,926,921 | A | | 7/1999 | Benoit |
| 6,039,496 | A | * | 3/2000 | Bishop ............... 403/4 |

(Continued)

FOREIGN PATENT DOCUMENTS

EP 1431596 A1 6/2004

(Continued)

*Primary Examiner* — Anita M King
(74) *Attorney, Agent, or Firm* — Robert A. McCann; Christopher S. Clancy; James H. Williams

(57) ABSTRACT

Certain embodiments of the present invention provide a control panel mount having one or more strain relief features. The mount has a base and a tether. The tether has a first end and a second end. The first end of the tether is rotatably connected to the base. The second end of the tether is adapted to receive a cable tie.

14 Claims, 10 Drawing Sheets

U.S. PATENT DOCUMENTS

| | | |
|---|---|---|
| 6,070,835 A | 6/2000 | Stillinger |
| 6,196,033 B1 | 3/2001 | Dowdle |
| 6,554,238 B1 | 4/2003 | Hibberd |
| 6,561,476 B2 * | 5/2003 | Carnevali .................. 248/288.31 |
| 6,718,597 B2 | 4/2004 | Geiger |
| 6,830,225 B2 | 12/2004 | Kato |
| 6,854,693 B2 | 2/2005 | Harrison et al. |
| 2005/0161570 A1 * | 7/2005 | Bauerly ........................ 248/317 |

FOREIGN PATENT DOCUMENTS

| | | |
|---|---|---|
| FR | 2918724 A1 | 1/2009 |
| KR | 20060089049 A | 8/2006 |

* cited by examiner

CONTROL PANEL MOUNT HAVING ONE OR MORE STRAIN RELIEF FEATURES

BACKGROUND OF THE INVENTION

The present invention relates to a cable mount for a control panel or other dynamic structures, such as robots. More particularly, the present invention relates to a control panel mount having one or more strain relief features.

Control panel mounts are well known in the art. Typically, a control panel mount includes a base. The base is connected to the control panel, for example, using adhesive. One or more cables in the control panel are bundled using a cable tie, and the cable tie is connected to the base of the control panel mount.

Control panel mounts support the weight of the cables, as well as the reaction load created by movement of the cables, which puts additional strain on the control panel mount. However, existing control panel mounts are not designed to relieve this additional strain. As described above, existing control panel mounts are rigid, so the entire load, including the reaction load created by movement of the cables, is concentrated at the base of the mount. To compensate for this deficiency, existing control panel mounts are limited as to the number of cables that they can handle, or more mounts are required over the same distance, both of which increases the time and expense of installation. If too many cables are attached to the control panel mount or an insufficient number of control panel mounts are utilized, the adhesive will fail, causing the base of the control panel mount to detach from the control panel.

Therefore, there is a need for a control panel mount having one or more strain relief features.

SUMMARY OF THE INVENTION

Certain embodiments of the present invention provide a mount for a control panel having one or more strain relief features. The mount has a base and a tether. The tether has a first end and a second end. The first end of the tether is rotatably connected to the base. The second end of the tether is adapted to receive a cable tie.

DETAILED DESCRIPTION OF THE INVENTION

FIGS. 1-10 illustrate a control panel mount 100 having one or more strain relief features according to one or more preferred embodiments of the present invention.

Figure 1:
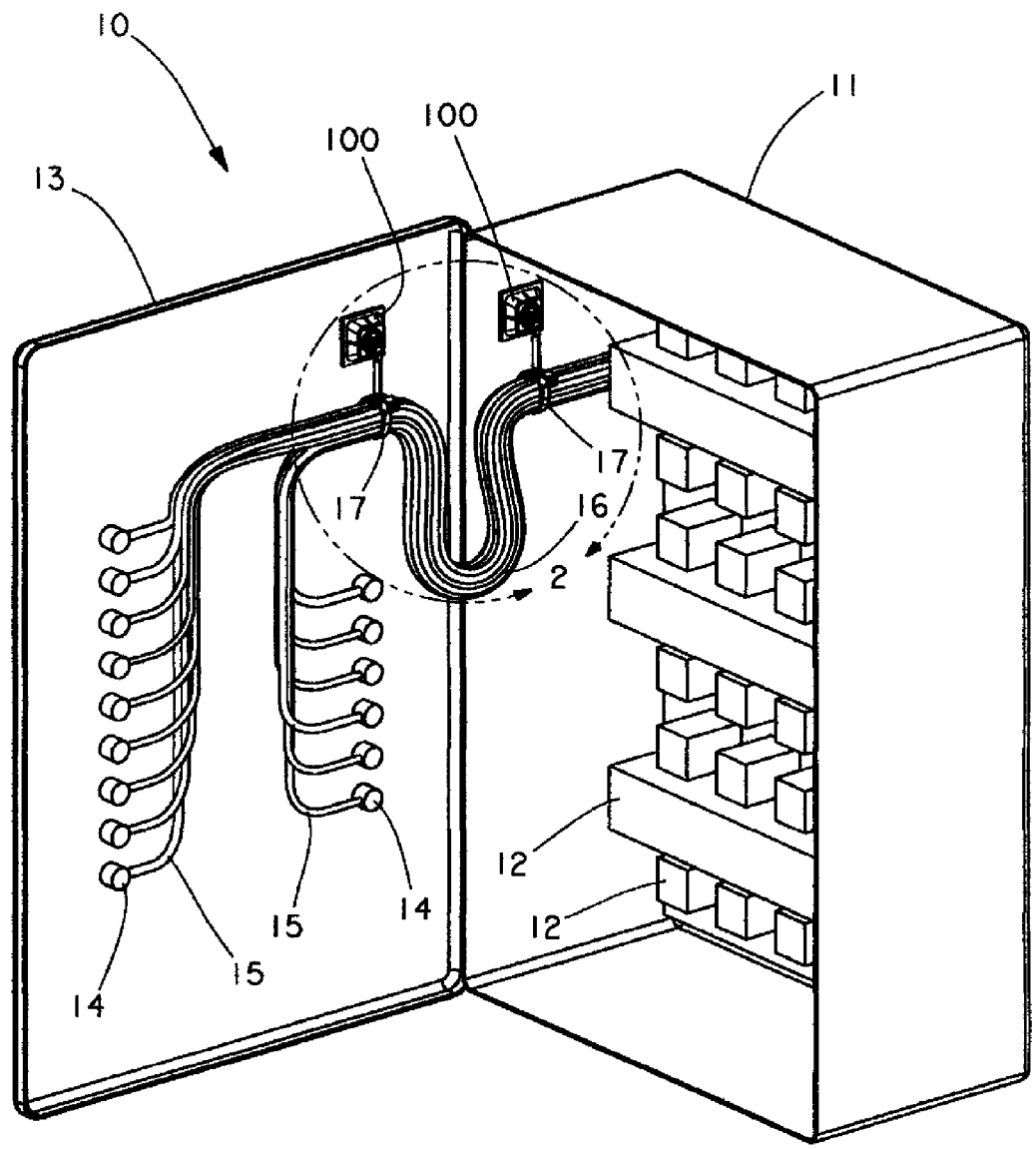
FIG. 1 is a perspective view of two mounts installed in a control panel according to an embodiment of the present invention.

As best seen in FIG. 1, a control panel 10 includes an enclosure 11. The enclosure 11 includes one or more electronic components 12, such as relays, power supplies, and/or programmable logic controllers ("PLC's"). The control panel 10 also includes a door 13. The door 13 includes one or more controls 14, such as displays, counters, alarms, push buttons, switches, touch screens, for controlling the electronic components 12 in the enclosure 11. The controls 14 are connected to the electronic components 12 using one or more cables 15, which may be formed into a bundle 16 using one or more cable ties 17.

One or more mounts 100 are placed at various locations along bundle 16 to secure the bundle 16 to the control panel 10. For example, as best seen in FIG. 1, a first mount 100 is connected to the enclosure 11 of the control panel 10, and a second mount 100 is connected to the door 13 of the control panel 10. The cable ties 17, and therefore, the cables 15, are also connected to the mounts 100.

Figure 2:
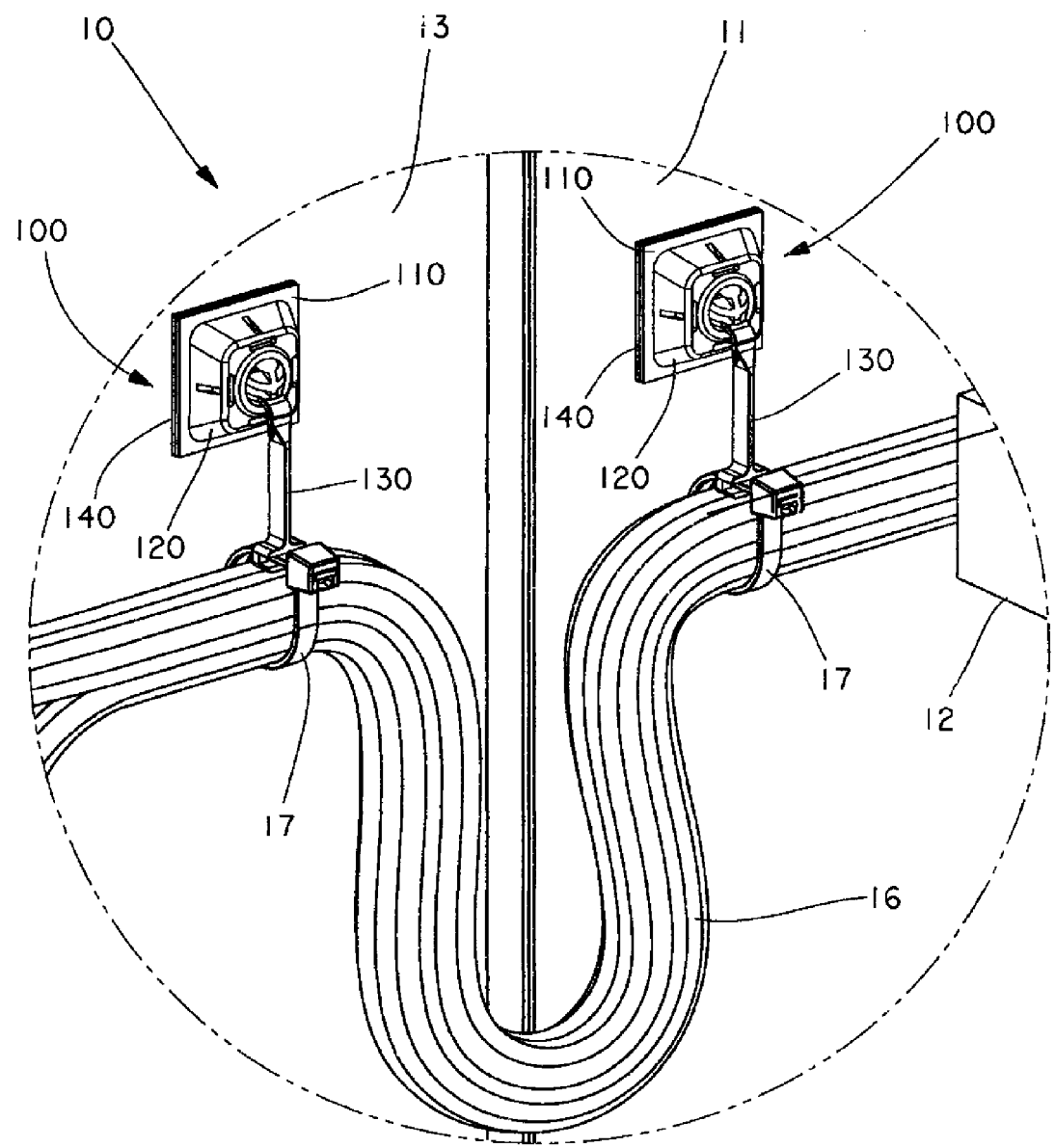
FIG. 2 is an enlarged perspective view of the mounts of FIG. 1.

As shown in FIG. 1 and FIG. 2, the door 13 of the control panel 10 is open, allowing access to the electronic components 12. However, the door 13 may be closed to protect the electronic components 12 from the surrounding environment. Opening or closing the door 13 of the control panel 10 moves the bundle 16 of cables 15, which in turn, strains the base 110 of the mount 100. However, the mounts 100 include one or more strain relief features, which are described below in more detail.

Figure 3:
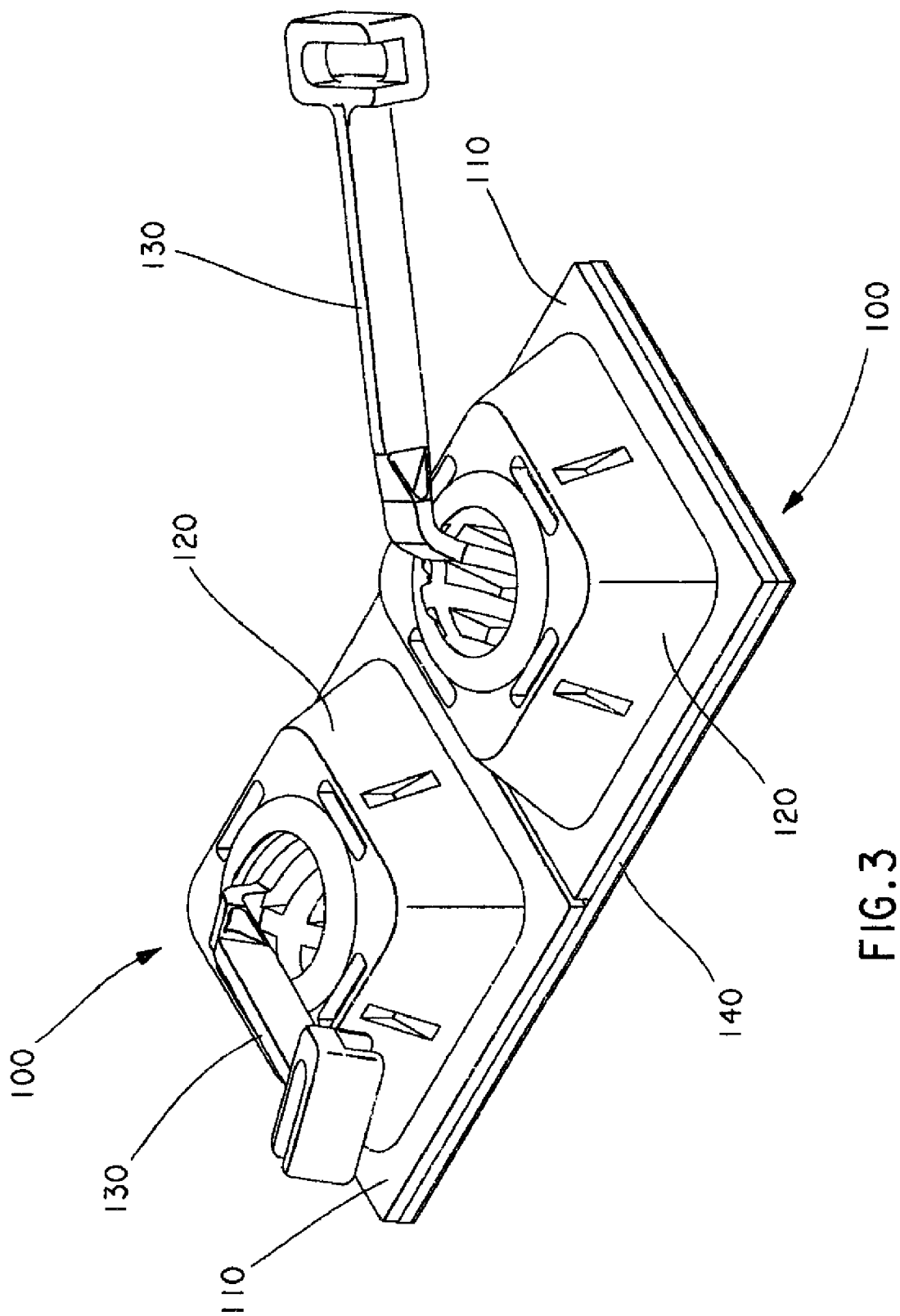
FIG. 3 is a perspective view of the mounts of FIG. 1 prior to installation.

As best seen in FIG. 3, each of the mounts 100 includes a base 110, a cap 120, and a tether 130. Additionally, each of the mounts 100 includes a fastener 140, such as adhesive tape or magnetic tape, for securing the mount 100 to the control panel 10, as shown in FIG. 1 and FIG. 2.

Figure 7:
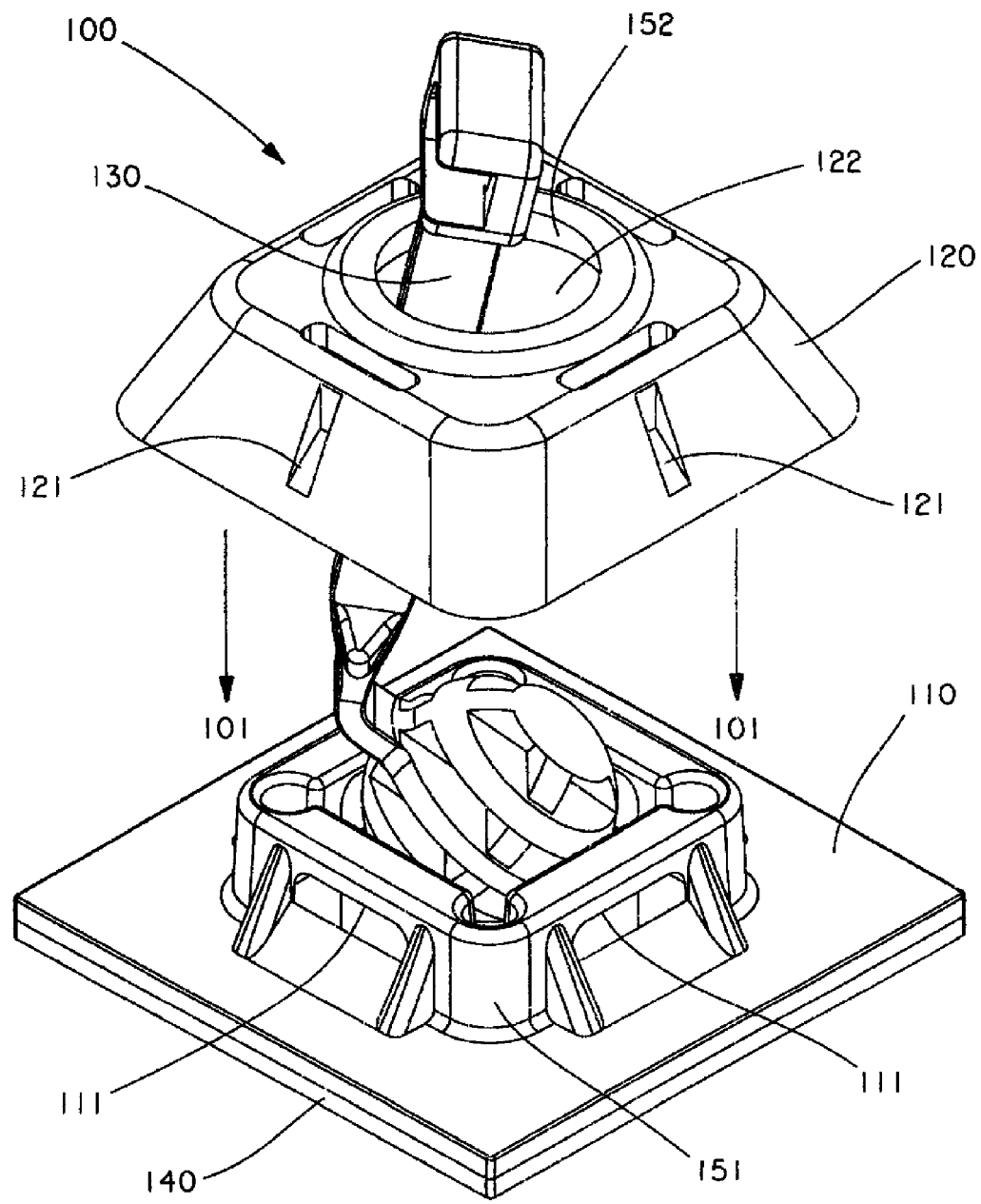
FIG. 7 is a partially exploded perspective view of one of the mounts of FIG. 1.
Figure 8:
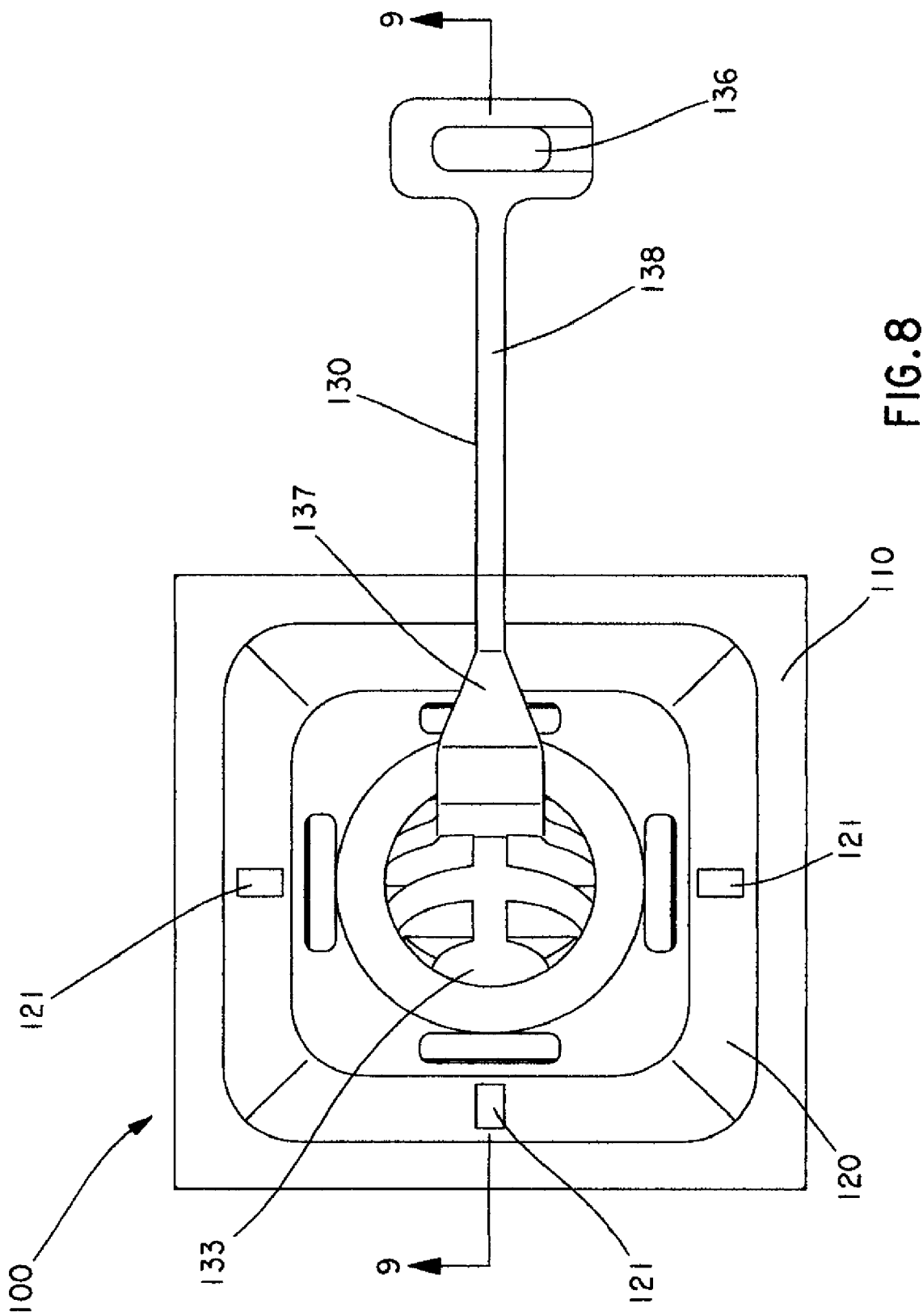
FIG. 8 is a top view of the mount of FIG. 7.

The cap 120 is connected to the base 110. For example, as best seen in FIG. 7 and further indicated by a pair of arrows 101, the cap 120 snap-fits to the base 110. That is, the cap 120 includes one or more snap-fit features, such as protrusions 121, which engage one or more corresponding snap-fit features, such as undercuts 111, on the base 110 of the mount 100.

Figure 9:
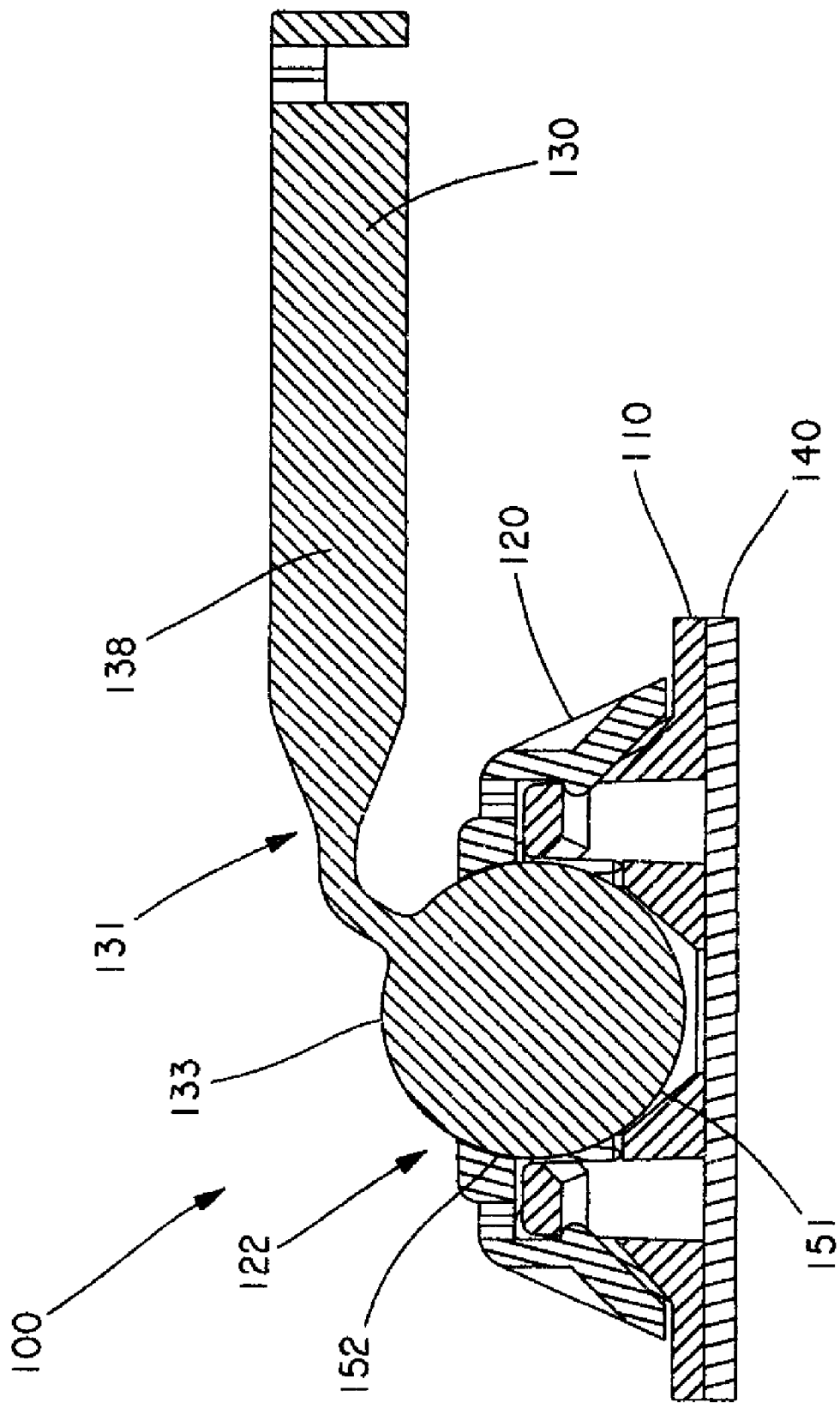
FIG. 9 is a cross-sectional view taken along lines 9-9 of FIG. 8.

Together, the base 110 and the cap 120 form a socket. For example, as best seen in FIG. 7 and FIG. 9, the base 110 includes a first portion 151 of the socket, and the cap 120 includes a second portion 152 of the socket. Alternatively, the base 110 and the cap 120 may be integrally formed. That is, the base 110 may include, for example, a one-piece, snap-fit socket. Alternatively, the base 110 may include a structure, such as a post, for rotatably engaging a corresponding structure on the tether 130.

Figure 4:
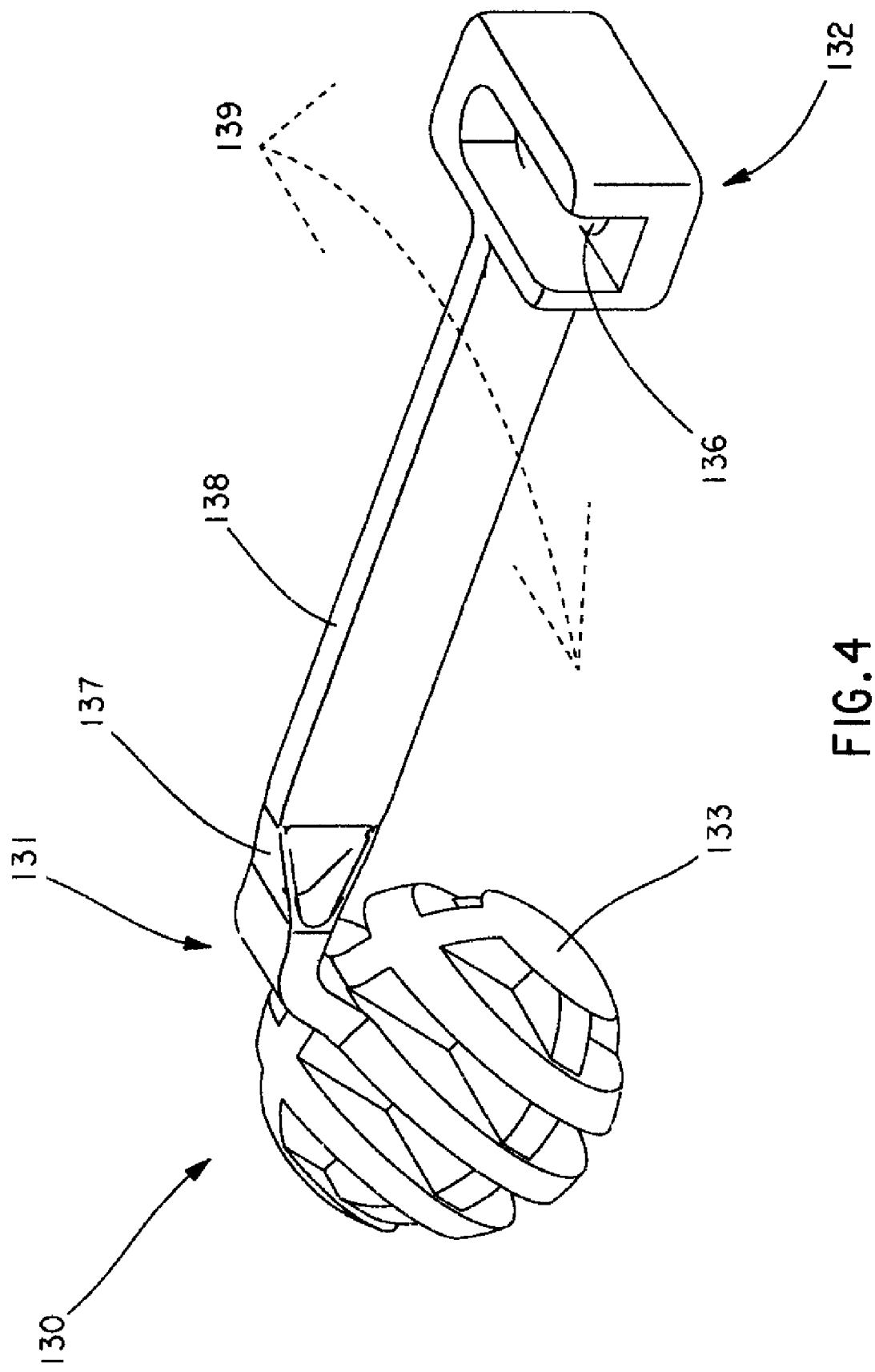
FIG. 4 is a perspective view of a tether for the mounts of FIG. 1.
Figure 5:
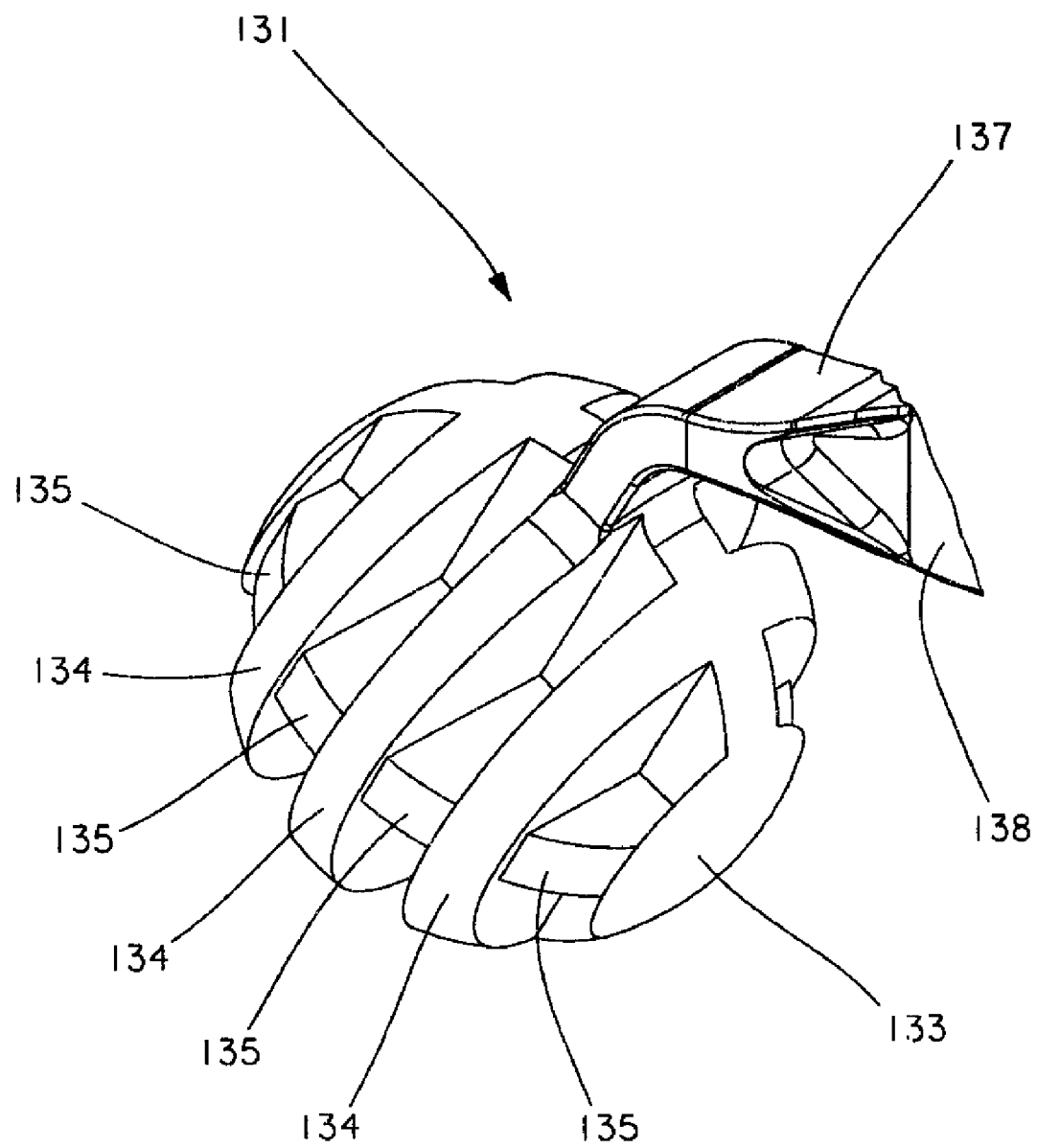
FIG. 5 is an enlarged perspective view of the tether of FIG. 4.
Figure 6:
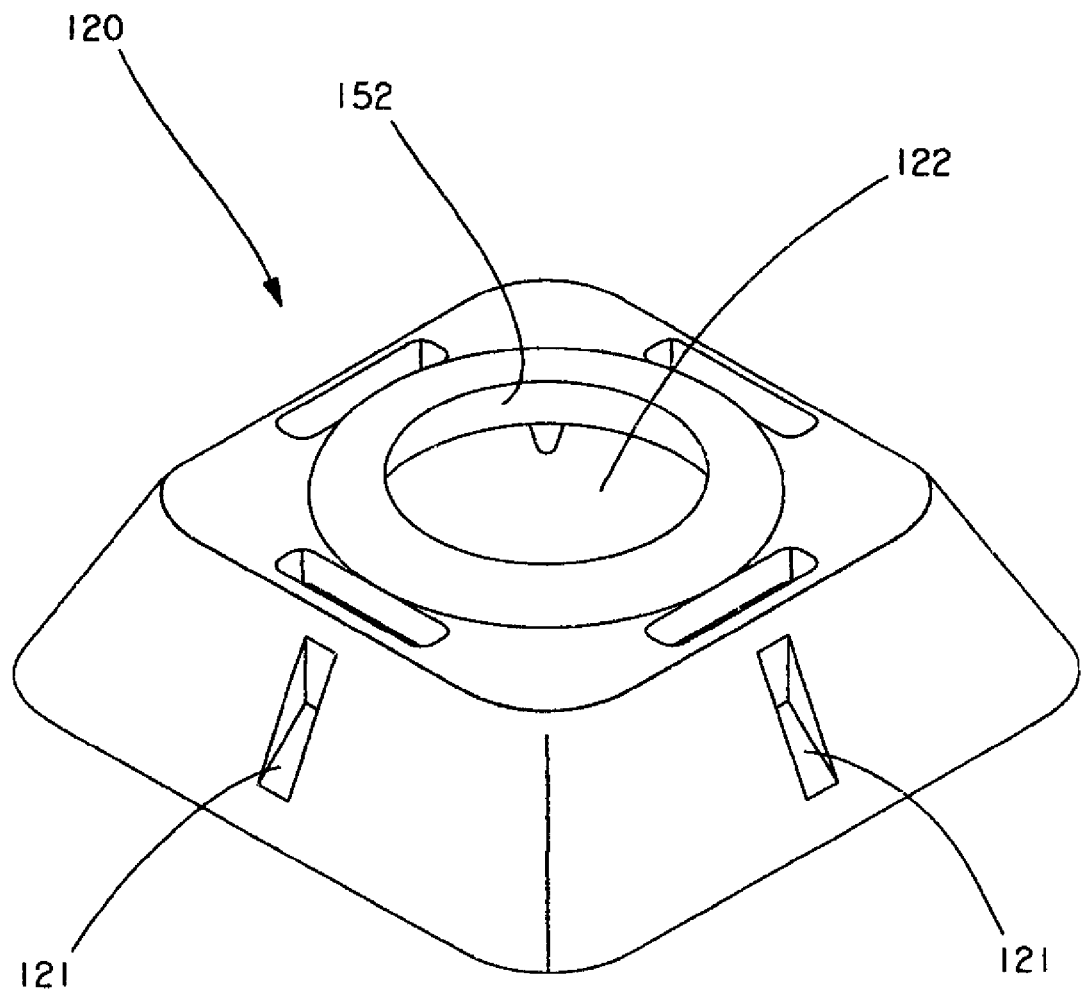
FIG. 6 is a perspective view of a cap for the mounts of FIG. 1.
Figure 10:
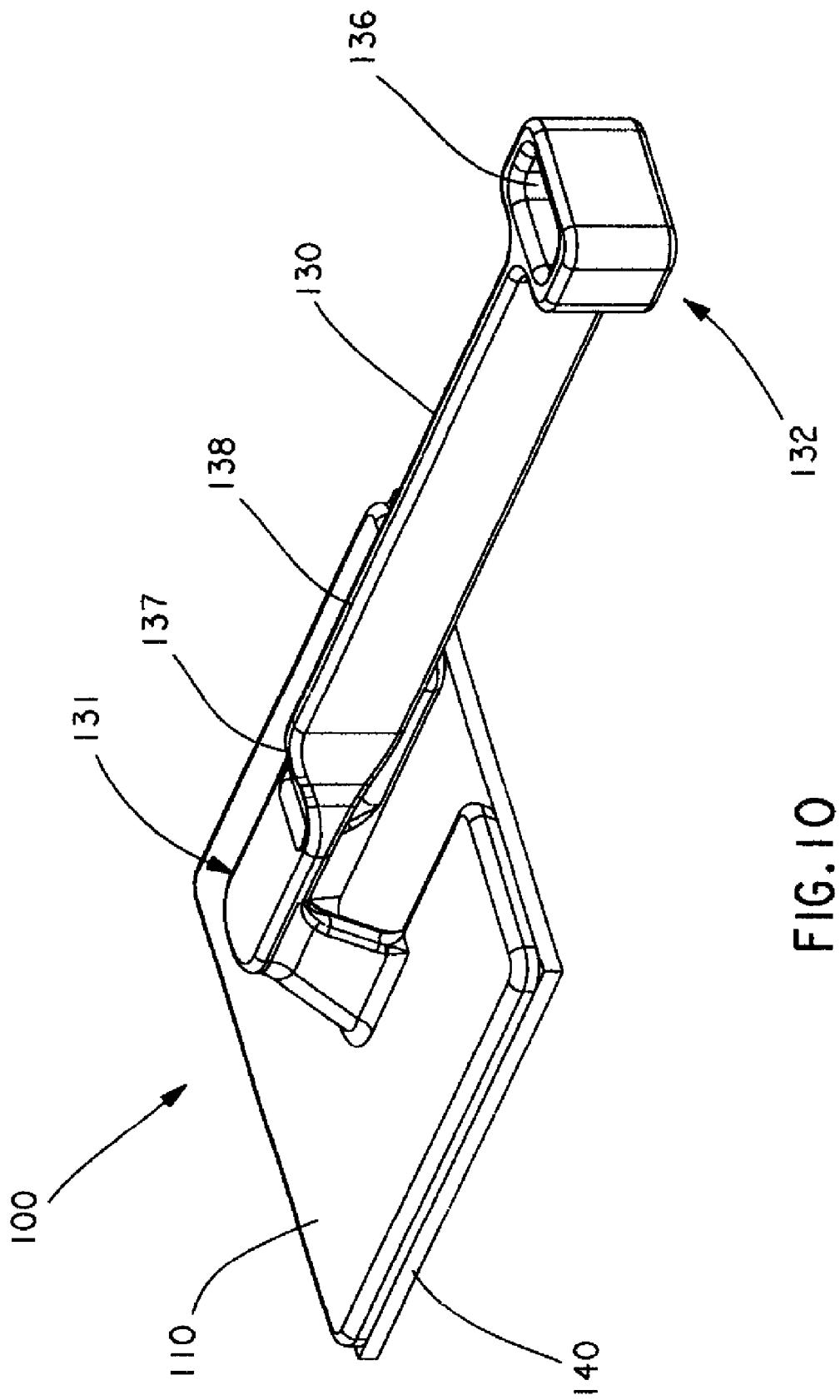
FIG. 10 is a perspective view of a mount according to another embodiment of the present invention.

As best seen in FIG. 4, the tether 130 includes a first end 131. The first end 131 of the tether 130 is rotatably connected to the base 110. For example, as best seen in FIG. 4 and FIG. 5, the first end 131 of the tether 130 includes a ball 133. The ball 133 is rotatably connected to the socket. The cap 120 secures the ball 133 to the base 110, and retains the ball 133 in the socket. The tether 130 extends though an aperture 122 in the cap 120. Alternatively, the first end 131 of the tether 130 may include a structure, such as a ring, for rotatably engaging a corresponding structure, such as a post, on the base 110 of the mount 100. As best seen in FIG. 10, the first end 131 of the tether 130 and the base 110 of the mount 100 may be integrally formed.

As best seen in FIG. 5, the ball 133 includes a plurality of fins 134. The fins 134 maintain contact with the socket, allowing the ball 133 to rotate while minimizing translation. Additionally, the ball 133 includes an equatorial fin 135. The equatorial fin 135 supports the other fins 134. The equatorial fin 135 is recessed with respect to the other fins 134, which prevents the equatorial fin 135 from being obstructed by the aperture 122 in the cap 120, as best seen in FIG. 9.

Allowing the tether 130 to rotate relieves some of the strain on the base 110 of the mount 100 caused by movement of the cables 15 or the bundle 16, and therefore, acts as a built-in form of strain relief in the mount 100.

As best seen in FIG. 4, the tether 130 includes a second end 132. The second end of the tether 130 is spaced apart from the first end of the tether 130, and therefore, the base 110 of the mount 100. The amount of separation between the second end 132 of the tether 130 and the base 110 of the mount 100 is determined by the length of the tether 130.

As shown in FIG. 1 and FIG. 2, the second end 132 of the tether 130 is connected to the cable tie 17. For example, as best seen in FIG. 4, the second end 132 of the tether 130 includes a slot 136 for receiving the cable tie 17. The cable tie 17 is separate from the mount 100, and slides within the slot 136, even when the cable tie 17 is secured to the bundle 16 of cables 15. Alternatively, the second end 132 of the tether 130 and the cable tie 17 may be integrally formed.

Allowing the cable tie 17 to slide in the slot 136 relieves some of the strain on the base 110 of the mount 100 caused by movement of the cables 15 or the bundle 16, and therefore, acts as a built-in form of strain relief in the mount 100.

As best seen in FIG. 4, the tether 130 includes a twist 137. The tether 130 also includes an arm 138 extending from the twist 137 toward the second end 132 of the tether 130. The twist 137 allows the arm 138 to bend or flex in a particular direction. For example, as shown in FIG. 4 and further indicated by an arrow 139, the tether 130 includes a twist 137 of 90°, which allows the arm 138 of the tether 130 to bend or flex in a plane that is parallel to the base 110 of the mount 100. It is likewise contemplated that the tether 130 may include a twist 137 of any angle, such as an angle between 0° and 180°. Preferably, the twist 137 is located near the first end 131 of the tether 130, as best seen in FIG. 4, to maximize the bendability or flexibility of the arm 138 of the tether 130, but it is likewise contemplated that the twist 138 may be located at any location along the tether 130.

Allowing the tether 130 to bend or flex relieves some of the strain on the base 10 of the mount 100 caused by movement of the cables 15 or the bundle 16, and therefore, acts as a built-in form of strain relief in the mount 100.

Therefore, as described above, certain embodiments of the present invention provide a control panel mount having one or more strain relief features.

While the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The illustrated embodiments are examples only and should not be taken as limiting the scope of the present invention. The claims should not be read as limited to the described order or elements unless stated to that effect. Therefore, all embodiments that come within the scope and spirit of the following claims and equivalents thereto are claimed as the invention.

The invention claimed is:

1. A mount for a control panel, the mount comprising:
    a base; and
    a tether having a first end and a second end, the first end of the tether being rotatably connected to the base, the second end of the tether having a slot for receiving a cable tie,
    wherein the tether includes a twist and an arm extending from the twist toward the second end of the tether, the twist allowing the arm of the tether to bend in a direction that is parallel to the base of the mount.

2. The mount of claim 1, wherein the base includes a socket and the first end of the tether includes a ball rotatably connected to the socket.

3. The mount of claim 2, wherein the ball includes a plurality of fins.

4. The mount of claim 3, wherein at least one of the fins is recessed with respect to the other fins.

5. The mount of claim 1, wherein the second end of the tether is spaced apart from the base of the mount.

6. The mount of claim 1, wherein the cable tie slides within the slot when the cable tie is secured to a bundle of cables.

7. The mount of claim 1, further comprising a cap connected to the base.

8. The mount of claim 7, wherein the cap is snap-fitted to the base.

9. The mount of claim 7, wherein the cap secures the first end of the tether to the base.

10. The mount of claim 7, wherein the second end of the tether extends through an aperture in the cap.

11. The mount of claim 7, wherein the base and the cap form a socket and the first end of the tether includes a ball rotatably connected to the socket.

12. A mount for a control panel, the mount comprising:
    a base having a socket; and
    a tether having a first end and a second end, the first end of the tether having a ball rotatably connected to the socket, the ball having a plurality of fins, the second end of the tether being adapted to receive a cable tie,
    wherein the tether includes a twist and an arm extending from the twist toward the second end of the tether, the twist allowing the arm of the tether to bend in a direction that is parallel to the base of the mount.

13. The mount of claim 12, wherein at least one of the fins is recessed with respect to the other fins.

14. The mount of claim 12, wherein the second end of the tether is spaced apart from the base of the mount.

* * * * *